UNITED STATES PATENT OFFICE.

FREDERICK RANSOME, OF IPSWICH, ENGLAND.

IMPROVEMENT IN THE MANUFACTURE OF STONE, CEMENT, AND PLASTER.

Specification forming part of Letters Patent No. 55,545, dated June 12, 1866.

*To all whom it may concern:*

Be it known that I, FREDERICK RANSOME, of Ipswich, in the county of Suffolk, England, have invented or discovered new and useful Improvements in the Manufacture of Artificial Stone and Cement or Plaster; and I, the said FREDERICK RANSOME, do hereby declare the nature of the said invention, and in what manner the same is to be performed, to be particularly described and ascertained in and by the following statement thereof—that is to say:

In the manufacture of artificial stone, and also cement for plastering and other uses, I employ a mixture of chalk, quicklime, and soluble silicate; or, in addition to or in place of chalk in this compound, sand, clay, and other similar substances may be employed, as the chalk is not itself necessarily chemically acted on, but it serves to give substance to the composition, and makes it durable when molded into a mass or applied as a plaster to a surface, which a composition consisting wholly of quicklime and soluble silicate is not.

Very useful compositions of this description are the following:

For artificial stones, chalk, five parts by weight; quicklime, one part by weight; solution of silicate of soda, (specific gravity 1.700,) diluted with water to work to the consistence required, one part by weight. Or, chalk, two parts by weight; slaked lime, one part by weight; sand, eight parts by weight; clay, one part by weight; silicate of soda, (specific gravity 1.700,) two parts by weight. Or, sand, eight parts by weight; clay, one part by weight; quicklime, one part by weight; solution of soluble silica, (specific gravity 1.700,) two parts by weight.

If the mixtures are required for use as cements or plasters they should be mixed thinner, and the solution of soluble silicate should be of less specific gravity. These compositions should be molded or applied as soon as they are mixed, as they set rapidly; and I prefer to wash over the surface after the composition has set with a solution of chloride of calcium—say specific gravity 1.2, or thereabout. In case the soluble silicate should be in excess, this, however, is not essential.

In some cases I make a composition consisting of chalk, sand, or other suitable mineral in a powdered state, soluble silicate, and a soluble salt of an alkaline earth, or of aluminium or iron. I mix this compound so as to bring it to a plastic state, and then immediately mold it or apply it to the surface to be coated, when it is to be used as a plaster. This molding or spreading must be done rapidly, as the compound sets hard almost immediately after it is mixed.

The following is the composition of a very good artificial stone of this description: Powdered chalk, six parts; solution of silicate of soda, (specific gravity 1.200,) one part; solution of chloride of calcium, (specific gravity 1.200,) one part. In mixing these materials I prefer first to knead together the chalk and silicate of soda, and afterward add to it and mix as rapidly as possible the solution of chloride of calcium, and when the materials are properly mixed the composition is at once molded or applied, as may be required. When the composition is required for use as a cement or plaster, the quantity of silicate of soda and of chloride of calcium is advantageously increased, the specific gravities of the solutions being reduced in proportion.

In making artificial stone suitable for rubbers or grinding-surfaces, the following ingredients may be used: One hundred-weight of ground glass or ground pumice-stone or emery; one gallon silicate of soda, (specific gravity 1.750, or thereabout.) The specific gravity of the silicate, however, will depend upon the purposes for which the rubbers, &c., are required, the strength and hardness thereof being in proportion to the quantity and specific gravity of the silicate employed. The glass, pumice-stone, or emery should be intimately mixed and incorporated with the silicate of soda in such manner as to render the mixture convenient to be worked into molds or shapes.

The artificial stone, after being prepared as above and allowed to dry, is then treated with a solution of chloride of calcium or other soluble salt of an alkaline earth or of aluminium or iron; and for this purpose I generally employ a solution of chloride of calcium of specific gravity 1.200 or 1.300, which is applied either by means of a common brush to the surface or by simply immersing the stone in the solution, or where convenient by forcing the solution into the pores and interstices of the stone, &c., by means of hydraulic pumps or otherwise.

I would observe that in all cases silicate of potash may be employed in place of silicate of soda; but it is more expensive and the result obtained will not be improved.

What I claim is—

1. The manufacture of artificial stone, cement, or plaster by mixing silicate of soda or potash with quicklime and chalk or sand or clay, or other similar substance, substantially as described.

2. The manufacture of artificial stone, cement, or plaster by mixing together in a paste chalk or sand or other suitable mineral in a powdered state, soluble silicate, and a soluble salt of any alkaline earth or of aluminium or iron, substantially as described.

FREDK. RANSOME.

Witnesses:
G. F. WARREN,
H. SOUTER,
Both of No. 17 Gracechurch Street, London, E. C.